US007126916B1

(12) United States Patent
Lauffenburger et al.

(10) Patent No.: US 7,126,916 B1
(45) Date of Patent: Oct. 24, 2006

(54) SYSTEM AND METHOD FOR PACKET BYPASS IN A COMMUNICATION SYSTEM

(75) Inventors: Kenneth A. Lauffenburger, Carrollton, TX (US); William A. Perry, Jr., Addison, TX (US); Keith P. Knauber, Irving, TX (US); Roy E. Rowan, Terrell, TX (US)

(73) Assignee: Efficient Networks, Inc., Dallas, TX (US)

( * ) Notice: Subject to any disclaimer, the term of this patent is extended or adjusted under 35 U.S.C. 154(b) by 1127 days.

(21) Appl. No.: 09/645,866

(22) Filed: Aug. 24, 2000

(51) Int. Cl.
*G08C 15/00* (2006.01)
*H04L 12/26* (2006.01)
*H04L 12/54* (2006.01)
*H04J 3/12* (2006.01)

(52) U.S. Cl. .................. 370/235; 370/428; 370/528
(58) Field of Classification Search ............... 370/412, 370/428, 429, 494, 522, 528, 229, 235, 389
See application file for complete search history.

(56) References Cited

U.S. PATENT DOCUMENTS

| 4,914,650 | A | * | 4/1990 | Sriram ................. 370/235 |
| 5,463,620 | A | * | 10/1995 | Sriram ................. 370/412 |
| 5,557,608 | A | * | 9/1996 | Calvignac et al. ........ 370/389 |
| 5,764,645 | A | * | 6/1998 | Bernet et al. .......... 370/395.52 |
| 5,793,768 | A | * | 8/1998 | Keshav ................ 370/400 |
| 5,940,405 | A | * | 8/1999 | Sakuma ................ 370/468 |
| 6,067,301 | A | * | 5/2000 | Aatresh ................ 370/418 |
| 6,570,849 | B1 | * | 5/2003 | Skemer et al. ........ 370/230.1 |
| 6,956,818 | B1 | * | 10/2005 | Thodiyil ............... 370/230 |
| 2001/0021949 | A1 | * | 9/2001 | Blightman et al. ....... 709/219 |
| 2001/0053152 | A1 | * | 12/2001 | Sala et al. ............. 370/412 |
| 2001/0055303 | A1 | * | 12/2001 | Horton et al. .......... 370/389 |
| 2002/0087732 | A1 | * | 7/2002 | Boucher et al. ........ 709/250 |

FOREIGN PATENT DOCUMENTS

EP   0 329 159 A2   8/1989
WO   99/04536      1/1999

OTHER PUBLICATIONS

Balakrishnan, Hari, et al. The Effects of Asymmetry on TCP Performance. Sep. 30, 1997.*
PCT International Search Report Form PCT/ISA/210, Jun. 7, 2002.

* cited by examiner

*Primary Examiner*—Kevin C. Harper
(74) *Attorney, Agent, or Firm*—Baker Botts L.L.P.

(57) ABSTRACT

A method for packet bypass in a communications network includes receiving a plurality of packets, determining whether each packet is a bypass packet or a non-bypass packet, and communicating the non-bypass packets toward a communication link. The method also includes communicating a plurality of the bypass packets toward the communication link between communication of two of the non-bypass packets.

25 Claims, 4 Drawing Sheets

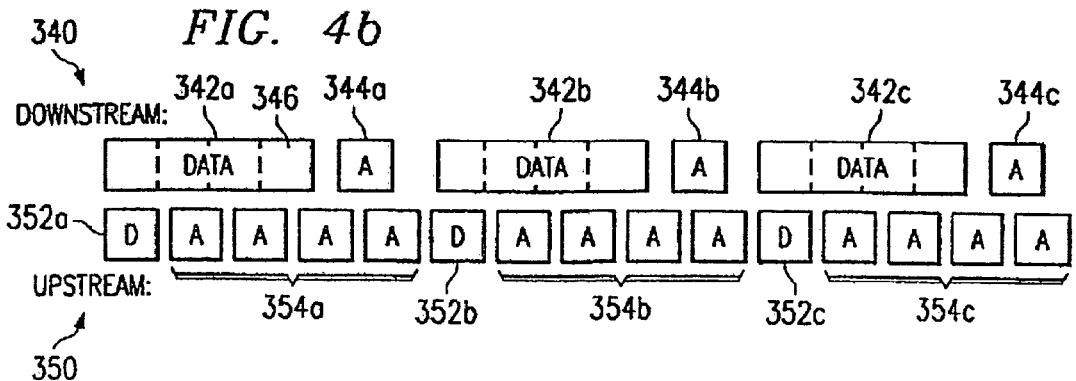
FIG. 4b
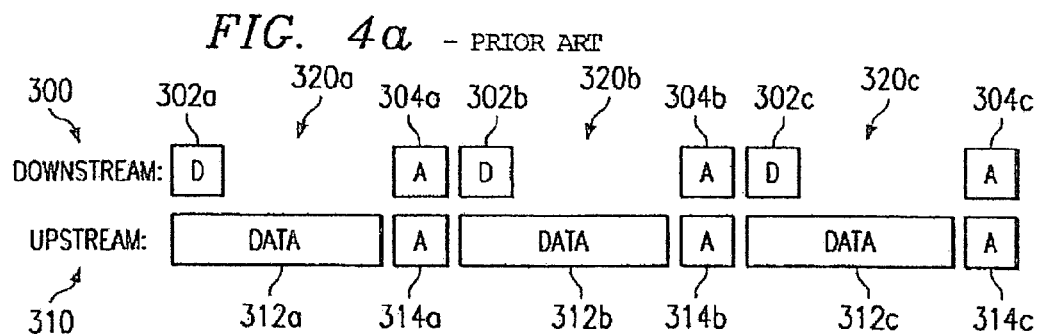
FIG. 4a - PRIOR ART
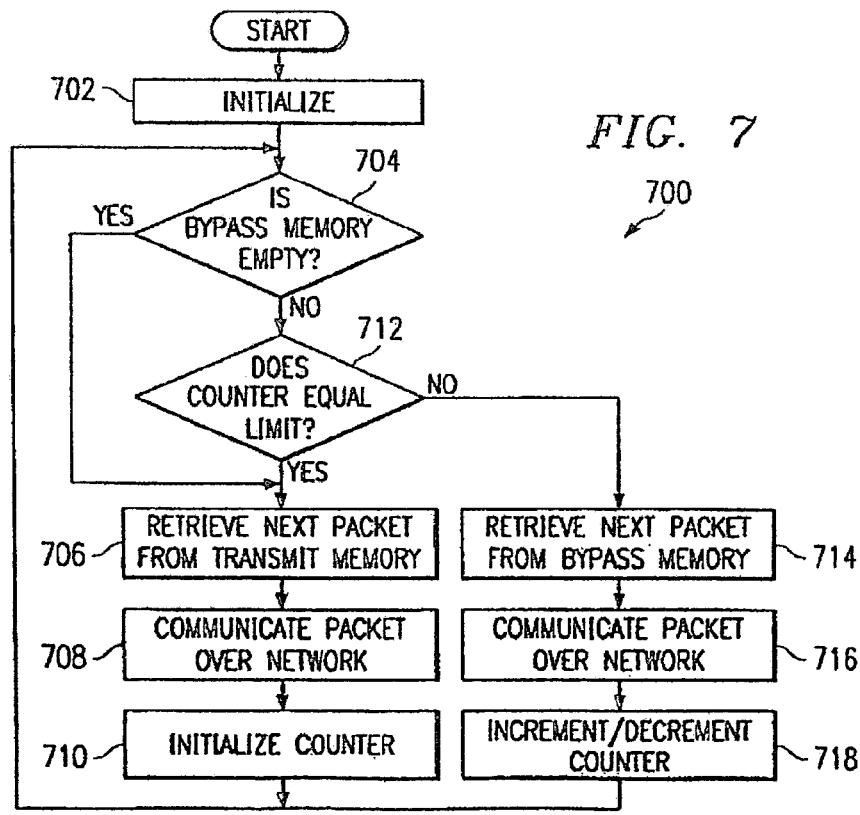
FIG. 7

SYSTEM AND METHOD FOR PACKET BYPASS IN A COMMUNICATION SYSTEM

TECHNICAL FIELD OF THE INVENTION

This invention relates generally to communications systems, and more particularly to a system and method for packet bypass in a communications system.

BACKGROUND OF THE INVENTION

Computers often communicate over a network using asymmetrical communications protocols. For example, in the Asymmetrical Digital Subscriber Line (ADSL) protocol, the downstream bandwidth is typically larger than the upstream bandwidth. As a result, the downstream transmission rate, or the rate at which information is communicated from another network element to the subscriber, is typically higher than the upstream transmission rate, or the rate at which information is transferred from the subscriber to another network element.

Network elements may communicate with one another by transferring packets of information over the network. A source network element packetizes information into one or more packets and then communicates the packets over the network toward a destination network element. Depending on the transmission protocol used, the destination network element may send acknowledgment messages to the source network element indicating that the destination network element successfully received the information packets. The Transmission Control Protocol (TCP) is one example of a protocol that supports the transfer of acknowledgment messages.

Subscribers to network services typically execute multiple applications at the customer premises, and each of those applications may use a transmission protocol that supports acknowledgment messages. Applications downloading information from other network elements may need to send acknowledgment messages to the sending network element to confirm the proper receipt of information. The sending network element may delay communicating additional information to the subscriber until it receives the acknowledgment messages. At the same time, the same application or another application executed at the subscriber's premises may seek to upload other information to a network element. Transmission of this information can temporarily delay communication of the acknowledgment messages, resulting in a delay in the receipt of information downloaded from the network element awaiting those acknowledgment messages. For example, in both the upstream and the downstream directions, the information packets and the acknowledgment messages may become interleaved. In the upstream direction, the subscriber typically transmits one information packet, one acknowledgment message, one information packet, one acknowledgment message, and so on. In the downstream direction, the subscriber typically receives one information packet, one acknowledgment message, one information packet, one acknowledgment message, and so on. The interleaving of the information packets and the acknowledgment messages can delay the transmission of the acknowledgment messages where the upstream bandwidth is saturated with information packets. The subscriber's delay in sending the acknowledgment messages can result in the network element receiving those acknowledgment messages at a slower rate, which causes that network element to transmit information to the subscriber at a slower rate. As a result, the transmission rates in the upstream and downstream directions typically equalize. The actual downstream transmission rate achieved by the subscriber is usually at or near the slower upstream transmission rate. The subscriber is unable to take advantage of the higher transmission rate in the downstream direction.

SUMMARY OF THE INVENTION

The present invention recognizes a need for a system and method for packet bypass in a communications system, which reduce or eliminate some or all of the problems and disadvantages associated with prior systems and methods.

In one embodiment of the invention, a method for packet bypass in a communications network includes receiving a plurality of packets, determining whether each packet is a bypass packet or a non-bypass packet, and communicating the non-bypass packets toward a communication link. The method also includes communicating a plurality of the bypass packets toward the communication link between communication of two of the non-bypass packets.

In another embodiment of the invention, a system for packet bypass in a communications network comprises a communications manager operable to receive a plurality of packets and to determine whether each packet is a bypass packet or a non-bypass packet. The system further includes a memory accessible to the communications manager and operable to receive bypass packets and non-bypass packets from the communications manager. The communications manager is further operable to retrieve bypass packets and non-bypass packets from the memory and to communicate toward a communication link a plurality of the bypass packets between communication of two of the non-bypass packets.

Numerous technical advantages can be gained through various embodiments of the invention. Various embodiments of the invention may exhibit none, some, or all of the following advantages. For example, in one embodiment of the invention, a system is provided that determines whether each packet is a bypass packet or a non-bypass packet. The system then communicates a plurality of bypass packets toward a communication link without non-bypass packets interleaved between the bypass packets. This allows the system to reorder the packets being communicated toward the communication link and to give priority to the transfer of bypass packets over non-bypass packets. In a particular embodiment, each bypass packet contains an acknowledgment message, so the system transfers acknowledgment messages toward a communication link at an increased rate, and reduces delay in communication of information in the downstream direction.

Some embodiments of the invention also allow a subscriber to achieve higher transfer rates using asymmetrical communications protocols. Because acknowledgment messages are being communicated toward a communication link at a faster rate by a subscriber, the network element receiving the acknowledgment messages may transfer information to the subscriber at a faster rate. This helps to reduce the equalization between the transmission rates in the upstream and downstream directions. The actual transmission rates achieved by the subscriber increase, allowing the subscriber to take advantage of the higher transmission rates provided by asymmetrical communications protocols.

Other technical advantages will be readily apparent to one of skill in the art from the attached figures, description, and claims.

BRIEF DESCRIPTION OF THE DRAWINGS

For a more complete understanding of the present invention and the advantages thereof, reference is now made to the following descriptions taken in connection with the accompanying drawings, in which:

FIGS. 4a and 4b are block diagrams illustrating exemplary data communications in the system of FIG. 1;

FIG. 7 is a flowchart illustrating an exemplary method for communicating information packets.

DETAILED DESCRIPTION OF THE INVENTION

Figure 1:
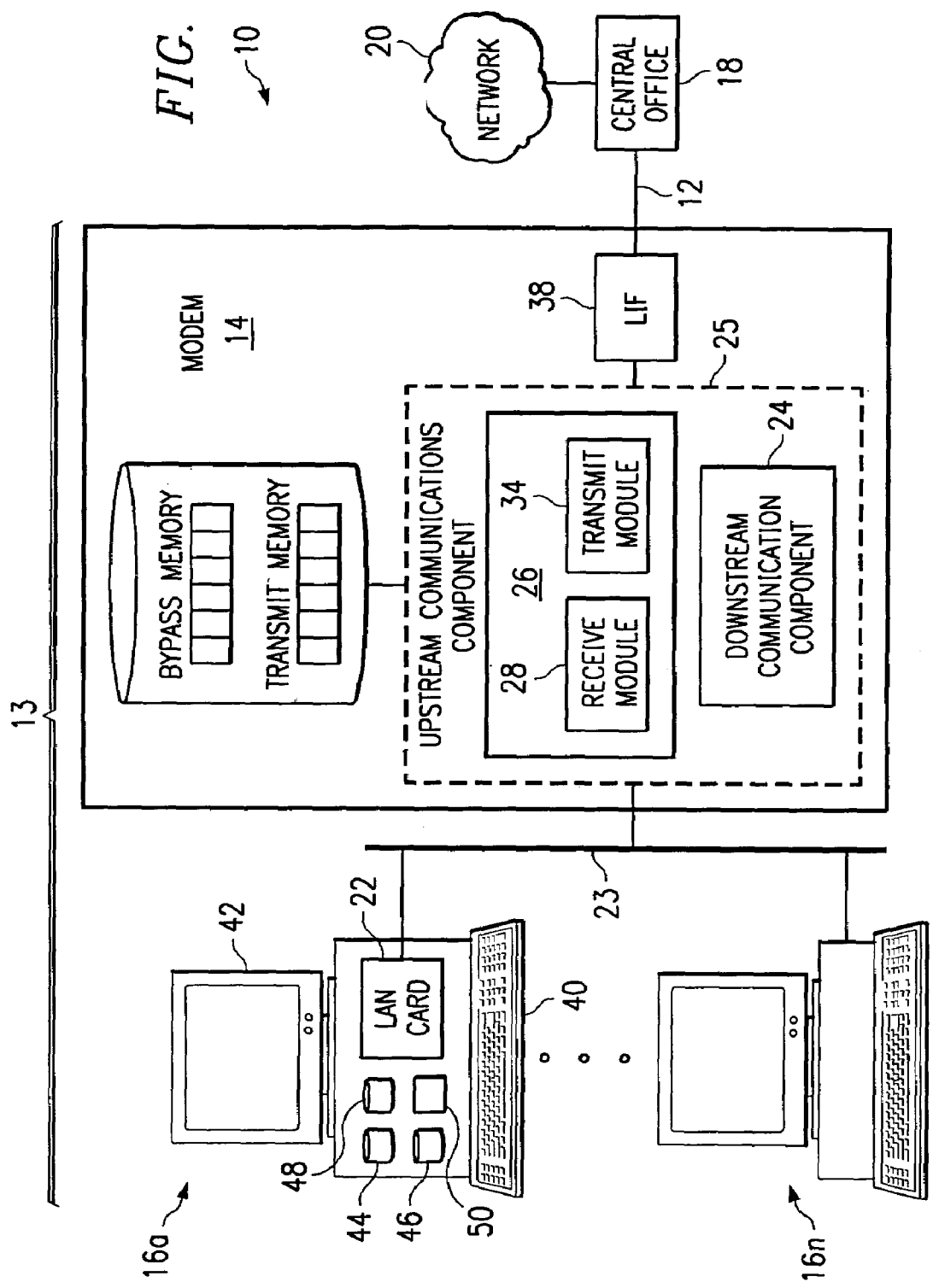
FIG. 1 is a block diagram illustrating an exemplary communications system.

FIG. 1 is a block diagram illustrating an exemplary communications system 10. In general, system 10 operates to manage communication of signal packets to and from various network elements. Throughout this document, the term "packet" refers to a logical grouping of information that contains voice, data, video, and/or other information. Each packet may or may not include control information. As used in this document, the term "cell" refers generally to a subset of the larger signal packets. In the illustrated embodiment, system 10 includes a communication link 12 coupling customer premises equipment 13, which may include a modem 14 and one or more hosts 16a–16n, to external network elements, such as central office equipment 18 and various other networks 20. Other embodiments of system 10 may be used without departing from the scope of the present invention.

In one aspect of operation, one or more hosts 16 may execute multiple applications, each application transmitting and/or receiving information over communication link 12. At least one application receives information packets in a downstream direction from a sending network element, such as central office 18, and communicates acknowledgment messages in an upstream direction back toward the sending network element. Throughout this document, the term "downstream" refers to a communication path from a sending network element to an application utilizing the information received from the sending network element. The term "upstream" refers to a communication path from the application toward the sending network element.

Various ones of the applications executing on hosts 16 may compete for bandwidth in the upstream direction. These applications may transmit packets containing application information and/or packets containing acknowledgment messages toward sending network elements. Because the amount of information received from the sending network elements may vary depending on how fast customer premises equipment 13 communicates acknowledgment messages toward the sending network elements, it may be desirable to reorder the packets being communicated toward the sending network element. In one embodiment, customer premises equipment 13 communicates packets containing acknowledgment messages at a faster rate than other packets. By communicating acknowledgment messages to central office 18 at a higher rate, customer premises equipment 13 may receive information at a higher rate from central office 18.

Communication link 12 couples customer premises equipment 13 to external network elements, such as central office 18. In this document, the term "couple" refers to any direct or indirect communication between two or more elements in system 10, whether or not those elements are in physical contact with one another. Also, throughout this document, the term "communication link" refers to any suitable wireless or wireline system that supports communication between network elements using ground-based and/or space-based components. Further, in this document, the phrase "network element" refers to any component operable to communicate over a communication network, including modem 14 and hosts 16.

Communication link 12 facilitates communication between customer premises equipment 13 and external network elements, such as central office 18. Communication link 12 may comprise any communications medium operable to facilitate communication of analog and/or digital signals, such as a twisted-pair copper telephone line or a fiber optic line. In another embodiment, communication link 12 may comprise a wireless link between customer premises equipment 13 and, for example, central office 18. In a particular embodiment, communication link 12 comprises an asymmetrical communication link, such as an Asymmetrical Digital Subscriber Line (ADSL) communication medium. In an asymmetric communication link, the bandwidth in the upstream direction is typically smaller than the bandwidth in the downstream direction. Other configurations could be used without departing from the scope of the invention.

When used with an asymmetrical communication link 12, the present invention may be particularly useful in reordering the packets communicated in the upstream direction over communication link 12. For example, acknowledgment messages may receive higher priority than other packets. This may allow the bandwidth in the upstream and downstream directions to be utilized more efficiently by allowing the sending network element receiving the acknowledgment messages to receive them at a faster rate. As a result, the sending network element may transfer data to host 16 at a faster rate allowing system 10 to more fully utilize the available bandwidth.

Central office 18 is coupled to communication link 12 and a network 20. Central office 18 facilitates communication between network 20 and hosts 16 over communication link 12. Network 20 may include any suitable wireline or wireless system that supports communication between network elements using ground-based and/or space-based components. For example, network 20 may be a public switched telephone network (PSTN), an integrated services digital network (ISDN), a local area network (LAN), a wide area network (WAN), a global computer network such as the Internet, or any other communications system or systems at one or more locations.

Each host 16 is coupled to or includes all or a part of the functionality embodied in modem 14. Host 16 may comprise any device operable to execute one or more applications and to communicate over communication link 12. Host 16 may, for example, comprise a workstation, a mainframe computer, a miniframe computer, a desktop computer, a laptop computer, a personal digital assistant, or any other computing or communicating device. In operation, host 16 may execute any appropriate operating system, such as MS-DOS, PC-DOS, OS-2, WINDOWS, and UNIX. Host 16 may include an input device 40, an output device 42, a random access memory (RAM) 44, a read-only memory (ROM) 46, a CD-ROM, hard drive, or other magnetic or optical storage media 48, or other appropriate volatile or nonvolatile storage and retrieval devices, and a processor 50 having a system clock or other suitable timing device or software.

Input device 40 may comprise, for example, a keyboard, a mouse, a graphics tablet, a touch screen, a pressure-sensitive pad, a joystick, a light pen, a microphone, or other suitable input device. Output device 42 may comprise, for example, a video display, a printer, a disk drive, a plotter, a speaker, or other suitable output device.

In the illustrated embodiment, host 16 also includes a local area network (LAN) card 22. LAN card 22 facilitates communication between host 16 and modem 14 over a communication link 23, such as a local area network or an Ethernet. LAN card 22 may comprise any hardware, software, firmware, or combination thereof operable to facilitate an interface between host 16 and modem 14. In another embodiment, host 16 communicates with modem 14 using any other suitable communication method, including communication through a universal serial bus (USB) or a Peripheral Component Interconnect (PCI) local bus.

Modem 14 is coupled to host 16 and communication link 12. Modem 14 provides an interface between host 16 and communication link 12. Throughout this document, the term "modem" refers to any combination of hardware, software, and/or firmware operable to facilitate an interface between a communication link and a host device. For example, modem 14 may transport information packets between host 16 and central office 18. The features and elements of modem 14 may reside externally to host 16, or may be partially or completely integrated into host 16.

In one embodiment, modem 14 comprises a digital subscriber line (DSL) modem. Modem 14 may implement any of the DSL protocols, including full-rate ADSL, ADSL Lite, and Very-high-rate DSL (VDSL). Modem 14 may also comprise a cable modem or other suitable communication device. Although this description describes the invention as it relates to DSL transmission, the invention may also be used in systems employing other communications protocols. In addition, the invention contemplates other later revisions, modifications, enhancements, or new types of communications techniques.

In the illustrated embodiment, modem 14 includes a communication manager communications manager 25 operable to facilitate communication of information between hosts 16 and external network elements, such as central office 18. In a particular embodiment, communications manager 25 includes a downstream communication component 24 and an upstream communication component 26. Downstream communication component 24 receives information packets from a sending network element, such as central office 18 or another network element communicating with customer premises equipment 13 over communication link 12. Upstream communication component 26 receives information packets from host 16 and communicates the packets toward a sending network element over communication link 12. In the illustrated embodiment, upstream communication component 26 includes a receive module 28 and a memory 30. Other configurations and/or functional partitions within modem 14 may be used without departing from the scope of the present invention. For example, although this embodiment shows upstream communication component 26 and downstream communication component 24 as separate functional entities, they could be combined into a single component within or accessible to customer premises equipment 13.

Receive module 28 is coupled to host 16 and memory 30. Receive module 28 receives information packets from host 16 destined for a sending network element, such as central office 18. Receive module 28 also classifies the packets into one of at least two groups. Receive module 28 then stores the packets in memory 30 according to the classification of the packet. Receive module 28 may comprise any hardware, software, firmware, or combination thereof operable to receive and classify information packets.

In the illustrated embodiment, receive module 28 classifies packets into one of two groups. The groups may be referred to as bypass packets and non-bypass packets. In one embodiment, bypass packets are communicated toward a sending network element at a faster rate than non-bypass packets. Although receive module 28 is described as classifying packets into one of two groups, any suitable number of classifications may be used without departing from the scope of the invention.

Receive module 28 may use any suitable characteristics of the information packets to classify the packets as bypass or non-bypass. For example, receive module 28 may classify packets as bypass or non-bypass using the size of the packet, the protocol used to generate the packet, and/or the contents of the packet. Receive module 28 may use one or all of these or other characteristics to classify the packets. In a particular embodiment, receive module 28 is operable to classify a packet as a bypass packet if the packet has a specified size. For example, where an ATM protocol is used, system 10 may classify packets having a size of two cells as a bypass packet. Other size delineations could be used without departing from the scope of the invention.

In another embodiment, receive module 28 determines whether the packet contains a valid acknowledgment message, and packets containing valid acknowledgment messages are classified as bypass packets. In still another embodiment, receive module 28 identifies packets having a specified size, generated using a particular protocol (such as the Transmission Control Protocol (TCP)), and containing an acknowledgment message as bypass packets. Receive module 28 could use any other suitable characteristics and/or combination of characteristics to classify the packets.

In this embodiment, packets are stored in memory 30. Although memory 30 is shown within modem 14, all or a part of memory 30 could reside at any other location accessible to customer premises equipment 13. Memory 30 can store both bypass packets and non-bypass packets. Memory 30 comprises any of a variety of data structures, arrangements, or compilations operable to store and facilitate retrieval of various information accessible to customer premises equipment 13. This may include, for example, the use of a dynamic random access memory (DRAM), a static random access memory (SRAM), or any other suitable volatile or nonvolatile storage and retrieval device or combination of devices.

In a particular embodiment, memory 30 includes a transmit memory 31 and a separate bypass memory 32. Transmit memory 30 and bypass memory 32 could each comprise, for example, a first-in, first-out queue. In that embodiment, transmit memory 31 receives non-bypass packets from receive module 28, and bypass memory 32 receives bypass packets from receive module 28.

Alternatively, system 10 could store both bypass packets and non-bypass packets in a single memory structure. Bypass packets could be differentiated from non-bypass packets, for example, by including an identifier, such as a flag, along with the packet to identify the packet type. As a further example, non-bypass packets could be stored in one range of memory addresses while bypass packets are stored in another address range. Customer premises equipment 13 could search particular memory addresses or ranges of memory addresses when a particular packet type is to be transmitted. Other mechanisms for selectively accessing bypass and non-bypass packets could be used consistent with the invention.

Transmit module 34 is coupled to memory 30 and line interface 38. Transmit module 34 retrieves packets from memory 30 and communicates the packets through line interface 38 to a sending network element, such as central office 18. Transmit module 34 may comprise any hardware, software, firmware, or combination thereof operable to retrieve information packets and communicate the packets over communication link 12.

Transmit module 34 may use any suitable method to select and retrieve packets from memory 30. In one embodiment, transmit module 34 is operable to communicate a specific number of bypass packets over communication link 12 without interleaving any non-bypass packets in between the bypass packets. The maximum number of bypass packets communicated between two non-bypass packets can be optimally selected to maximize the downstream transmission rate without substantially interfering with the upstream rate. In a particular embodiment, transmit module 34 communicates up to five bypass packets over communication link 12 between communication of two of the non-bypass packets.

If a transmission opportunity occurs and memory 30 contains less than the maximum number of bypass packets, transmit module 34 communicates that number of bypass packets over communication link 12. If a transmission opportunity occurs and memory 30 contains no bypass packets, transmit module 34 communicates non-bypass packets over communication link 12 until a bypass packet becomes ready for transmission. Other methods may be used by transmit module 34 without departing from the scope of the present invention.

Communications manager 25 interfaces with communications link 12 through a line interface (LIF) 38. In this embodiment, line interface 38 is coupled to downstream communication component 24, upstream communication component 26, and communication link 12. Line interface 38 includes hardware, software, firmware, or a combination thereof operable to communicate information to and from communication link 12. For example, line interface 38 could comprise a network interface device and supporting software, such as multi-layer protocol support, protocol conversion, data processing, and data modulation software.

Although FIG. 1 illustrates one embodiment of system 10, numerous changes may be made to system 10 without departing from the scope of the invention. For example, FIG. 1 illustrates modem 14 as comprising memory 30 including transmit memory 31 and bypass memory 32, as well as communications manager 25 including receive module 28 and transmit module 34. In another embodiment, all or portions of the functionality implemented by those components may reside within another component within or accessible to customer premises equipment 13, such as host 16. Also, although modem 14 is illustrated as separate from host 16, all or a portion of modem 14 could reside within host 16. Further, although FIG. 1 illustrates multiple hosts 16 coupled to modem 14, a single host 16 may be coupled to modem 14. In addition, although the present invention has been described with respect to a modem 14 and a host 16, the invention may be implemented in any network element responsible for processing and/or communicating information over a communication link. For example, the invention may be implemented in a router, a bridge, a digital subscriber line access multiplexer (DSLAM), or a switch.

Figure 2:
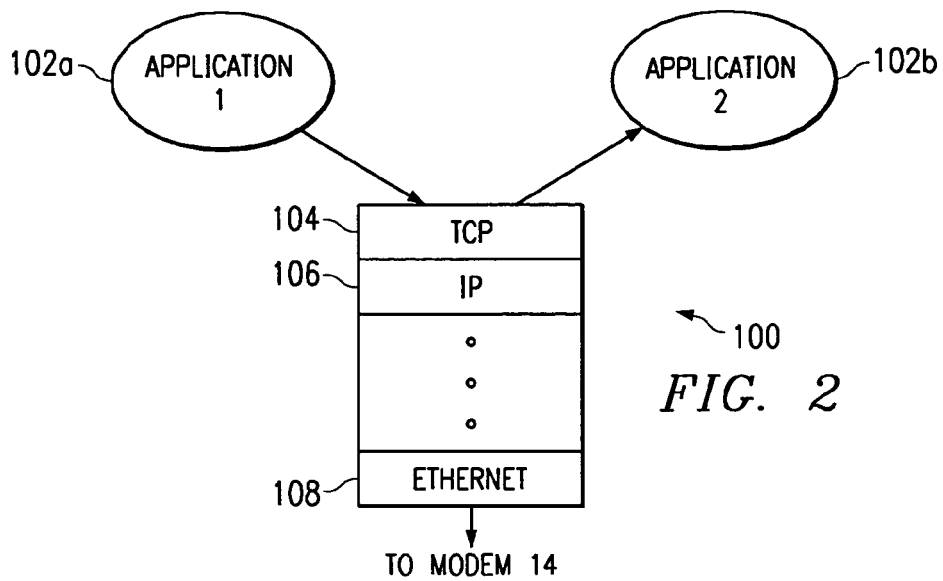
FIG. 2 is a block diagram illustrating an exemplary protocol stack in the system of FIG. 1.

FIG. 2 is a block diagram illustrating an exemplary protocol stack 100 in system 10 of FIG. 1. Protocol stack 100 may be implemented within host 16 to facilitate communication with modem 14, where modem 14 performs the functions of classifying packets received from host 16. In the illustrated embodiment, protocol stack 100 includes a plurality of applications 102a and 102b, a transport layer 104, a network layer 106, and a physical layer 108. Other embodiments of protocol stack 100 may be used without departing from the scope of the present invention.

Applications 102 represent different applications executed by host 16. In this document, the term "application" refers to a set of instructions, procedures, functions, objects, classes, and/or instances, and related data adapted for implementation in a suitable computer language such as C, C++, Java, or any other appropriate language. Application 102a represents an application that communicates more information in the upstream direction than it receives in the downstream direction, and application 102b represents an application that receives more information in the downstream direction than it communicates in the upstream direction. Applications 102 may represent any suitable application that may be executed by host 16, and any number of applications may be executed by host 16 without departing from the scope of the present invention.

Layer 104 implements a transport protocol used to allow host 16 to communicate with other network elements in network 20. Layer 104 receives information from application 102a and packetizes the information into information packets, and layer 104 passes the information packets to layer 106. Layer 104 also receives information packets for application 102b from layer 106, and layer 104 depacketizes the information in the packets. In the illustrated embodiment, layer 104 implements the TCP protocol. Layer 104 could also implement any other suitable transport protocol, including a protocol that supports the transfer of acknowledgment messages. For example, layer 104 could also implement the Internetwork Packet Exchange (IPX) protocol.

Layer 106 represents the network layer used to route information packets between host 16 and other network elements in network 20. Layer 106 receives information packets from layer 104 and addresses the packets so that they may be routed through network 20 toward a desired destination. Layer 106 passes the addressed packets to layer 108. Layer 106 also receives information packets from layer 108, and layer 106 passes the packets to layer 104. In the illustrated embodiment, layer 106 implements the Internet Protocol (IP). Layer 106 could also implement another suitable network layer protocol.

Layer 108 supports the physical transmission link between host 16 and modem 14. Layer 108 receives information packets from layer 106 and communicates the packets to modem 14. Layer 108 also receives packets from modem 14 and passes the packets to layer 106. In the illustrated embodiment, layer 108 supports an Ethernet connection between host 16 and modem 14. Layer 108 could also support any other physical communication link.

Figure 3:
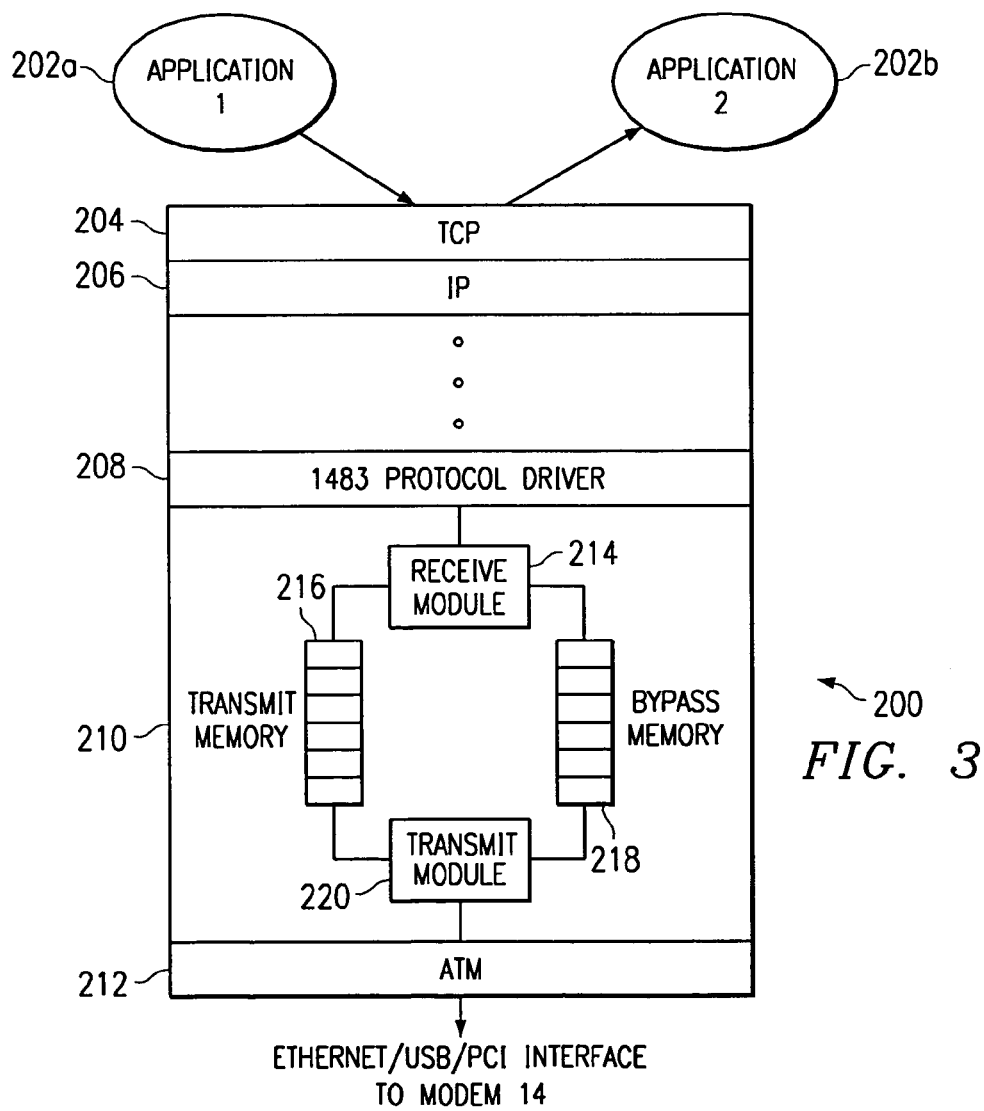
FIG. 3 is a block diagram illustrating another exemplary protocol stack in the system of FIG. 1.

FIG. 3 is a block diagram illustrating another exemplary protocol stack 200 in system 10 of FIG. 1. Protocol stack 200 may be implemented in another embodiment of system 10 where host 16 performs the functions of classifying the packets as bypass or non-bypass packets, and selectively communicating classified packets toward communication link 12.

In the illustrated embodiment, protocol stack 200 includes a plurality of applications 202a and 202b, a transport layer 204, a network layer 206, a 1483 protocol driver layer 208, a bypass layer 210, and a physical layer 212. Other embodiments of protocol stack 200 may be used without departing from the scope of the present invention.

Applications 202, layer 204, and layer 206 may be the same or similar to applications 102, layer 104, and layer 106, respectively, from FIG. 2. Layer 208 encapsulates information packets from layer 206 for transmission to modem 14, and layer 208 passes the encapsulated packets to bypass layer 210. Layer 208 also receives packets from bypass layer 210, removes the encapsulation, and passes the packets to layer 206. In the illustrated embodiment, layer 208 supports a 1483 protocol to encapsulate packets for transmission to modem 14 over an Asynchronous Transfer Mode (ATM) communication link. Layer 208 could also support any other encapsulation method, such as Frame Relay.

Bypass layer 210 implements the functionality of upstream communication component 26 described in FIG. 1. Bypass layer 210 receives information packets from layer 208, classifies the packets into one of at least two groups, and communicates the packets to layer 212. Bypass layer 210 may, for example, classify the packets as bypass or non-bypass packets and communicate bypass packets to layer 212 at a faster rate than non-bypass packets. In the illustrated embodiment, bypass layer 210 includes a receive module 214, a transmit memory 216, a bypass memory 218, and a transmit module 220. Receive module 214, transmit memory 216, bypass memory 218, and transmit module 220 may be the same or similar to receive module 28, transmit memory 31, bypass memory 32, and transmit module 34, respectively, from FIG. 1. Transmit memory 216 and bypass memory 218 could alternatively comprise a single memory structure.

Layer 212 supports the physical transmission link between host 16 and modem 14. Layer 212 may be the same or similar to layer 108 from FIG. 2. In the illustrated embodiment, layer 212 supports communications between host 16 and modem 14 using an ATM communication link. Layer 212 could also support any other physical communication link, such as an Ethernet link or a Frame Relay link.

FIGS. 4a and 4b are block diagrams illustrating exemplary data communications in system 10 of FIG. 1. FIG. 4a illustrates data communications between host 16 and central office 18 without the use of upstream communication component 26 of FIG. 1. FIG. 4b illustrates data communications between host 16 and central office 18 with the use of upstream communication component 26 of FIG. 1. Although FIGS. 4a and 4b are described with respect to upstream communication component 26 in modem 14 of FIG. 1, the same or similar benefits may be achieved using bypass layer 210 from FIG. 3.

A subscriber may execute multiple applications on host 16. A first application may require the uploading of large amounts of information, and a second may require the downloading of large amounts of information. For the first application, host 16 transmits information packets and receives acknowledgment messages for those information packets. For the second application, host 16 receives information packets and transmits acknowledgment messages for those information packets.

As shown in FIG. 4a, in both the downstream direction 300 and the upstream direction 310, the information packets and the acknowledgment messages may become interleaved. In the downstream direction 300, host 16 typically receives one information packet 302 followed by one acknowledgment message 304. In the upstream direction 310, host 16 typically transmits one information packet 312 followed by one acknowledgment message 314.

When host 16 communicates with a sending network element using an asymmetrical communications protocol, such as ADSL, for a given amount of information, packets 302 can be received by host 16 faster than packets 312 are transmitted by host 16. Because information packets 312 and acknowledgment messages 314 are interleaved in the upstream direction, the slow transfer rate of information packets 312 results in a correspondingly slow transfer rate of acknowledgment messages 314. Since the network element transmitting information packets 302 to host 16 in the downstream direction is waiting to receive acknowledgment messages 314, host 16 receives one information packet 302 followed by a waiting period 320. This causes the transfer rate in the downstream direction to decrease, preventing host 16 from maintaining a high transfer rate.

As shown in FIG. 4b, the use of upstream communication component 26 helps to prevent or reduce the interleaving of the packets and the acknowledgment messages in the upstream direction from slowing the overall communication rate. In the downstream direction 340, host 16 receives information blocks 342 containing multiple information packets 346, followed by an acknowledgment message 344. In the upstream direction 350, host 16 transmits a plurality of acknowledgment messages 354 without information packets 352 interleaved between the acknowledgment messages 354.

By using upstream communication component 26, host 16 transmits acknowledgment messages 354 at a faster rate than the non-bypass packets 352. This may allow host 16 to receive information packets 346 with fewer or no waiting periods 320. This may also allow a subscriber to receive a higher transfer rate in the downstream direction by avoiding the downstream transmission rate equalizing to a slower upstream rate.

Figure 5:
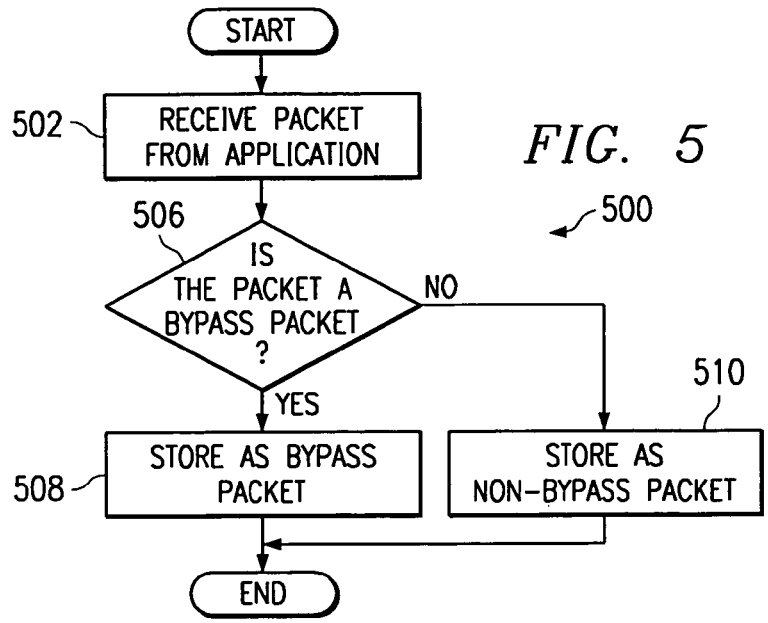
FIG. 5 is a flowchart illustrating an exemplary method for receiving information packets.

FIG. 5 is a flowchart illustrating an exemplary method 500 for receiving information packets. Although method 500 is described with respect to communications manager 25 in modem 14, the same or similar method may be used by receive module 214 in bypass layer 210.

Communications manager 25 receives an information packet from an application at step 502. This may include, for example, modem 14 receiving the packet from host 16 through LAN card 22. Communications manager 25 determines whether the packet is a bypass or a non-bypass packet at step 506. This may include, for example, classifying the packet using the size of the packet, the protocol used to generate the packet, and/or at least a portion of the contents of the packet. If the packet is a bypass packet, communications manager 25 stores the packet as a bypass packet at step 508. This may include, for example, storing the packet in a separate bypass memory 32, storing the packet in a particular range of memory addresses within memory 30, or setting an identifier such as a flag in the packet to indicate that it is a bypass packet. If the packet is a non-bypass packet, communications manager 25 stores the packet as a non-bypass packet in a similar manner at step 510.

Figure 6:
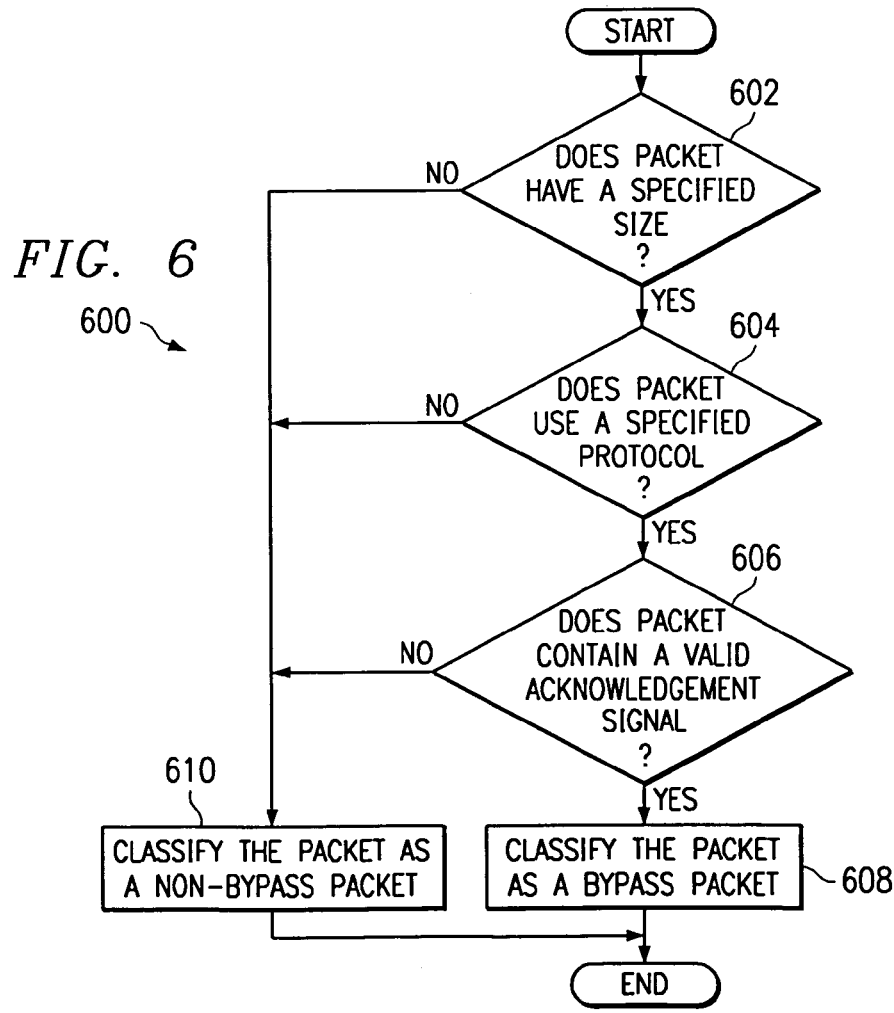
FIG. 6 is a flowchart illustrating an exemplary method for classifying information packets.

FIG. 6 is a flowchart illustrating one particular method 600 for classifying information packets. Although method 600 is described with respect to communications manager 25, the same or similar method may be used by receive module 214 in bypass layer 210.

Communications manager 25 determines at step 602 whether the packet has a specified size, such as a size of two cells. Communications manager 25 also determines at step 604 whether the packet was generated using a particular protocol, such as the TCP/IP protocol which supports the use of acknowledgment messages. Communications manager 25 further determines at step 606 whether the packet includes at least a portion of a specified content, such as a valid acknowledgment message. In this example, if all three conditions are met, communications manager 25 classifies the packet as a bypass packet at step 608. Otherwise, communications manager 25 classifies the packet as a non-bypass packet at step 610.

Communications manager 25 may determine whether a packet is a bypass or non-bypass packet using any of the identified characteristics in FIG. 6 or using other or additional characteristics. Communications manager 25 may also test packets for those characteristics in any order. In one embodiment, communications manager 25 tests the size of the packet, then the protocol used to generate the packet, and then the contents of the packet. In this embodiment, communications manager 25 may be able to quickly identify non-bypass packets. For example, communications manager 25 may be able to identify a size of a packet faster than determining whether the packet contains a valid acknowledgment message. By identifying the size of the packet first, communications manager 25 may quickly identify packets that are too large or too small to contain an acknowledgment message. Also, communications manager 25 may be able to identify the protocol used to generate the packet faster than identifying whether the packet contains a valid acknowledgment message. By identifying the protocol used to generate the packet, communications manager 25 may quickly identify packets generated using a protocol that does not support the use of acknowledgment messages.

FIG. 7 is a flowchart illustrating an exemplary method 700 for communicating information packets. Although method 700 is described with respect to communications manager 25, the same or similar method may be used by transmit module 220 in bypass layer 210.

Communications manager 25 is initialized at a step 702. This may include, for example, resetting any counters used by transmit module 34. For example, in one embodiment, communications manager 25 uses a counter to monitor how many bypass packets have been communicated toward communication link 12. When the counter reaches a certain value, or when there are no bypass packets ready for transmission, communications manager 25 communicates a non-bypass packet toward communication link 12. The counter may be initialized to any suitable value, such as zero or the maximum number of bypass packets that may be communicated toward communication link 12 between two non-bypass packets.

Communications manager 25 determines at step 704 whether memory 30 contains any bypass packets. If memory 30 contains no bypass packets, communications manager 25 retrieves a non-bypass packet from memory 30 at step 706. Communications manager 25 communicates the packet toward communication link 12 at step 708. Communications manager 25 reinitializes the counter at step 710, and returns to step 704 to determine if a bypass packet is available.

If memory 30 contains one or more bypass packets at step 704, communications manager 25 determines whether the counter equals a limit at step 712. When the counter equals the limit, communications manager 25 has previously communicated the maximum number of bypass packets that may be communicated between two non-bypass packets. As one particular nonlimiting example, communications manager 25 may communicate up to five bypass packets between two non-bypass packets. If the counter equals the limit, communications manager 25 proceeds to step 706 and retrieves a non-pass packet from memory 30.

If communications manager 25 has not previously communicated the maximum number of bypass packets at step 712, it retrieves a bypass packet from memory 30 at step 714. Communications manager 25 communicates the packet toward communication link 12 at step 716. Communications manager 25 increments the counter at step 718, and transmit module 34 returns to step 304 to retrieve another packet.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for packet bypass in a communications network with an asymmetrical upstream and downstream transmission rate, comprising:
   receiving a plurality of packets;
   determining whether each packet is a bypass packet or a non-bypass packet;
   optimally selecting a maximum number of bypass packets to communicate between two non-bypass packets to maximize the downstream transmission rate without substantially interfering with the upstream transmission rate;
   communicating the non-bypass packets toward a communication link; and
   communicating a plurality of the bypass packets toward the communication link between communication of two of the non-bypass packets,
   wherein each bypass packet comprises an acknowledgment message, and
   wherein each bypass packet comprises a Transmission Control Protocol (TCP) packet containing an acknowledgment message.

2. The method of claim 1, wherein determining whether each packet is a bypass packet or a non-bypass packet comprises determining a size of the packet.

3. The method of claim 2, wherein determining the size of the packet comprises classifying packets having a size smaller than a specified size as bypass packets.

4. The method of claim 1, wherein determining whether each packet is a bypass packet or a non-bypass packet comprises determining a content of the packet.

5. The method of claim 1, wherein determining whether each packet is a bypass packet or a non-bypass packet comprises determining at least one of a size of the packet, a protocol used to generate the packet, and a content of the packet.

6. A method for packet bypass in a communications network, comprising:
   receiving a plurality of packets;
   determining whether each packet is a bypass packet or a non-bypass packet;
   communicating the non-bypass packets toward a communication link; and
   communicating a plurality of the bypass packets toward the communication link between communication of two of the non-bypass packets, wherein determining whether each packet is a bypass packet or a non-bypass packet comprises:
  determining a size of the packet;
  if the packet does not have a specified size, classifying the packet as a non-bypass packet, otherwise determining a protocol used to generate the packet;
  if the packet was not generated using a specified protocol, classifying the packet as a non-bypass packet, otherwise determining a content of the packet; and
  if the packet does not include at least a portion of a specified content, classifying the packet as a non-bypass packet, otherwise classifying the packet as a bypass packet.

7. The method of claim 1, further comprising determining a maximum number of bypass packets that can be communicated between communication of two of the non-bypass packets.

8. The method of claim 1, further comprising storing each bypass packet and each non-bypass packet in a memory wherein the bypass packets and non-bypass packets can be selectively retrieved from the memory.

9. The method of claim 8, wherein the memory comprises:
  a bypass memory operable to store bypass packets; and
  a transmit memory separate from the bypass memory and operable to store non-bypass packets.

10. The method of claim 1, wherein the communication link comprises an Asymmetrical Digital Subscriber Line residing between a modem and a central office switch.

11. The method of claim 1, wherein the communication link comprises at least one of a universal serial bus, a Peripheral Component Interconnect local bus, or an Ethernet connection, residing between a host and a modem.

12. A system for packet bypass in a communications network having an asymmetrical communications link with an upstream and downstream bandwidth with different sizes, comprising:
  at least one computer readable medium; and
  software encoded on the computer readable medium, the software operable when executed to:
    receive a plurality of Transmission Control Protocol (TCP) packets;
    determine whether each packet is a bypass packet or a non-bypass packet;
    communicate the non-bypass packets upstream toward the asymmetrical a communication link; and
    communicate a plurality of the bypass packets upstream toward the asymmetrical communication link between communication of two of the non-bypass packets,
  wherein the software is operable to communicate up to a specified maximum number of bypass packets between communication of two non-bypass packets and wherein the maximum number is optimally selected to maximize the downstream bandwidth.

13. The system of claim 12, wherein each bypass packet comprises an acknowledgment message.

14. The system of claim 12, wherein the software is operable to determine whether each packet is a bypass packet or a non-bypass packet by determining a size of the packet.

15. The system of claim 14, wherein determining the size of the packet comprises classifying packets having a size smaller than a specified size as bypass packets.

16. The system of claim 12, wherein the software is operable to determine whether each packet is a bypass packet or a non-bypass packet by determining a content of the packet.

17. The system of claim 12, wherein the software is operable to determine whether each packet is a bypass packet or a non-bypass packet by determining at least one of a size of the packet, a protocol used to generate the packet, and a content of the packet.

18. The system of claim 12, wherein the software is operable to determine whether each packet is a bypass packet or a non-bypass packet by:
  determining a size of the packet;
  if the packet does not have a specified size, classifying the packet as a non-bypass packet, otherwise determining a protocol used to generate the packet;
  if the packet was not generated using a specified protocol, classifying the packet as a non-bypass packet otherwise determining a content of the packet; and
  if the packet does not include at least a portion of a specified content, classifying the packet as a non-bypass packet, otherwise classifying the packet as a bypass packet.

19. The system of claim 12, wherein the software is further operable to store each bypass packet and each non bypass packet in a memory wherein the bypass packets and non-bypass packets can be selectively retrieved from the memory.

20. The method of claim 19, wherein the memory comprises:
  a bypass memory operable to store bypass packets; and
  a transmit memory separate from the bypass memory and operable to store non-bypass packets.

21. The system of claim 12, wherein the communication link comprises an Asymmetrical Digital Subscriber Line residing between a modem and a central office switch.

22. The system of claim 12, wherein the communication link comprises at least one of a universal serial bus, a Peripheral Component Interconnect local bus, or an Ethernet connection, and resides between a host and a modem.

23. A system for packet bypass in a communications network having an asymmetrical communications link with an upstream and downstream bandwidth that are different sizes, comprising:
  a communications manager operable to receive a plurality Transmission Control Protocol (TCP) packets and to determine whether each packet is a bypass packet or a non-bypass packet; and
  a memory accessible to the communications manager and operable to receive bypass packets and non-bypass packets from the communications manager;
  wherein the communications manager is further operable to retrieve bypass packets and non-bypass packets from the memory and to communicate upstream toward the asymmetrical communication link a plurality of the bypass packets between communication of two of the non-bypass packets,
  wherein the downstream bandwidth is larger than the upstream bandwidth, and
  wherein the communications manager is operable to communicate up to a specified maximum number of bypass packets between communication of two non-bypass packets,
  wherein the communications manager is operable to determine whether each packet is a bypass packet or a non-bypass packet by determining a size of the packet.

24. The system of claim 23, wherein the communications manager is operable to classify all packets having a size smaller than a specified size as bypass packets.

25. A system for packet bypass in a communications network having an asymmetrical communications link with an upstream and downstream bandwidth that are different sizes, comprising:

a communications manager operable to receive a plurality Transmission Control Protocol (TCP) packets and to determine whether each packet is a bypass packet or a non-bypass packet; and a memory accessible to the communications manager and operable to receive bypass packets and non-bypass packets from the communications manager;

wherein the communications manager is further operable to retrieve bypass packets and non-bypass packets from the memory and to communicate upstream toward the asymmetrical communication link a plurality of the bypass packets between communication of two of the non-bypass packets, wherein the downstream bandwidth is larger than the upstream bandwidth, and wherein the communications manager is operable to communicate up to a specified maximum number of bypass packets between communication of two non-bypass packets, wherein the communications manager is operable to determine whether each packet is a bypass packet or a non-bypass packet by:

determining a size of the packet;

if the packet does not have a specified size, classifying the packet as a non-bypass packet, otherwise determining a protocol used to generate the packet;

if the packet was not generated using a specified protocol, classifying the packet as a non-bypass packet otherwise determining a content of the packet; and if the packet does not include at least a portion of a specified content, classifying the packet as a non-bypass packet, otherwise classifying the packet as a bypass packet.

* * * * *